E. LANE.
SMOKE CONSUMING FURNACE.
APPLICATION FILED OCT. 4, 1909.
1,165,982.
Patented Dec. 28, 1915.
8 SHEETS—SHEET 2.
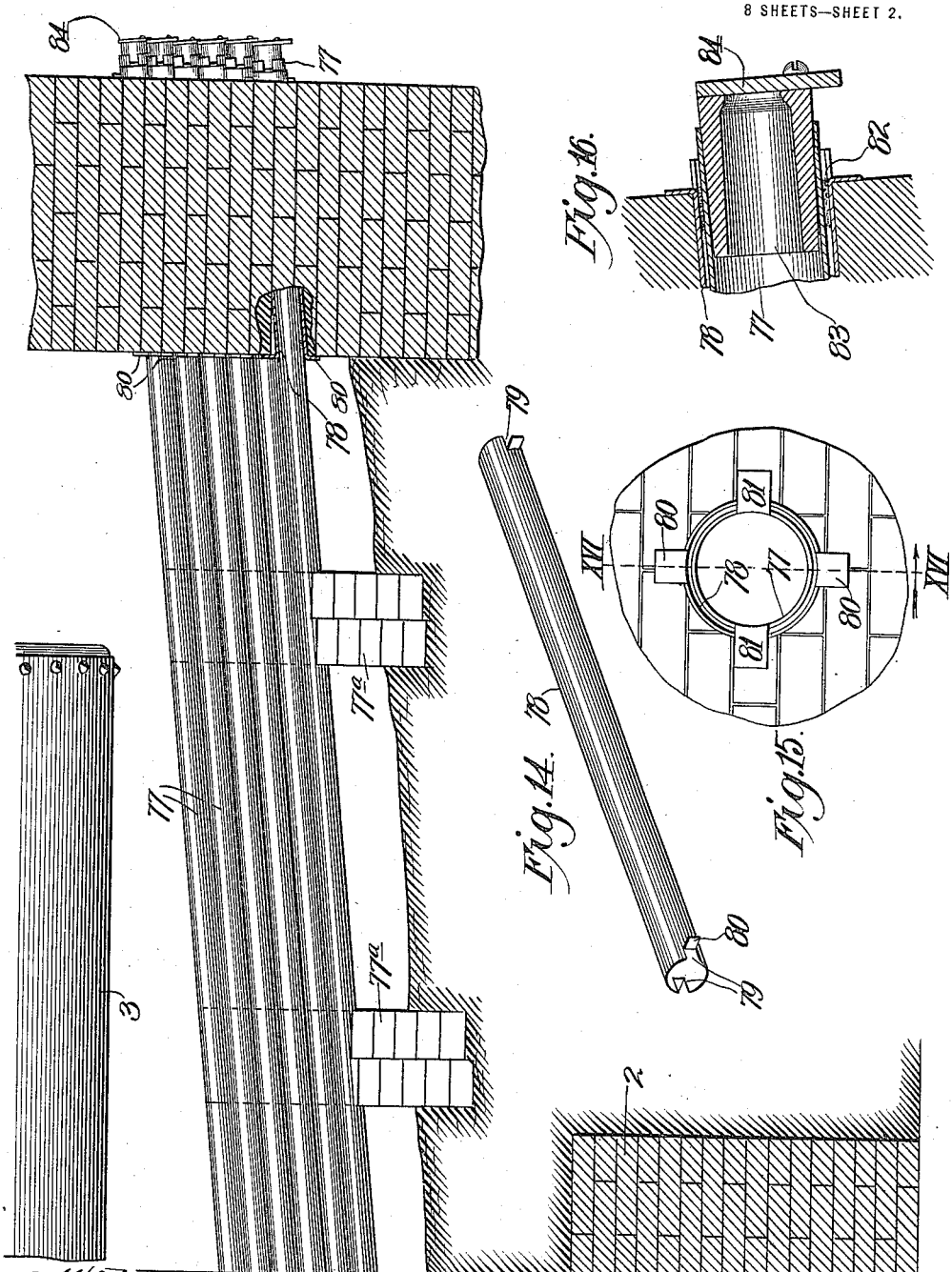
Witnesses
Frank R. Elon
H. C. Rodgers
Inventor
Edward Lane
By George C. Hopp Atty.

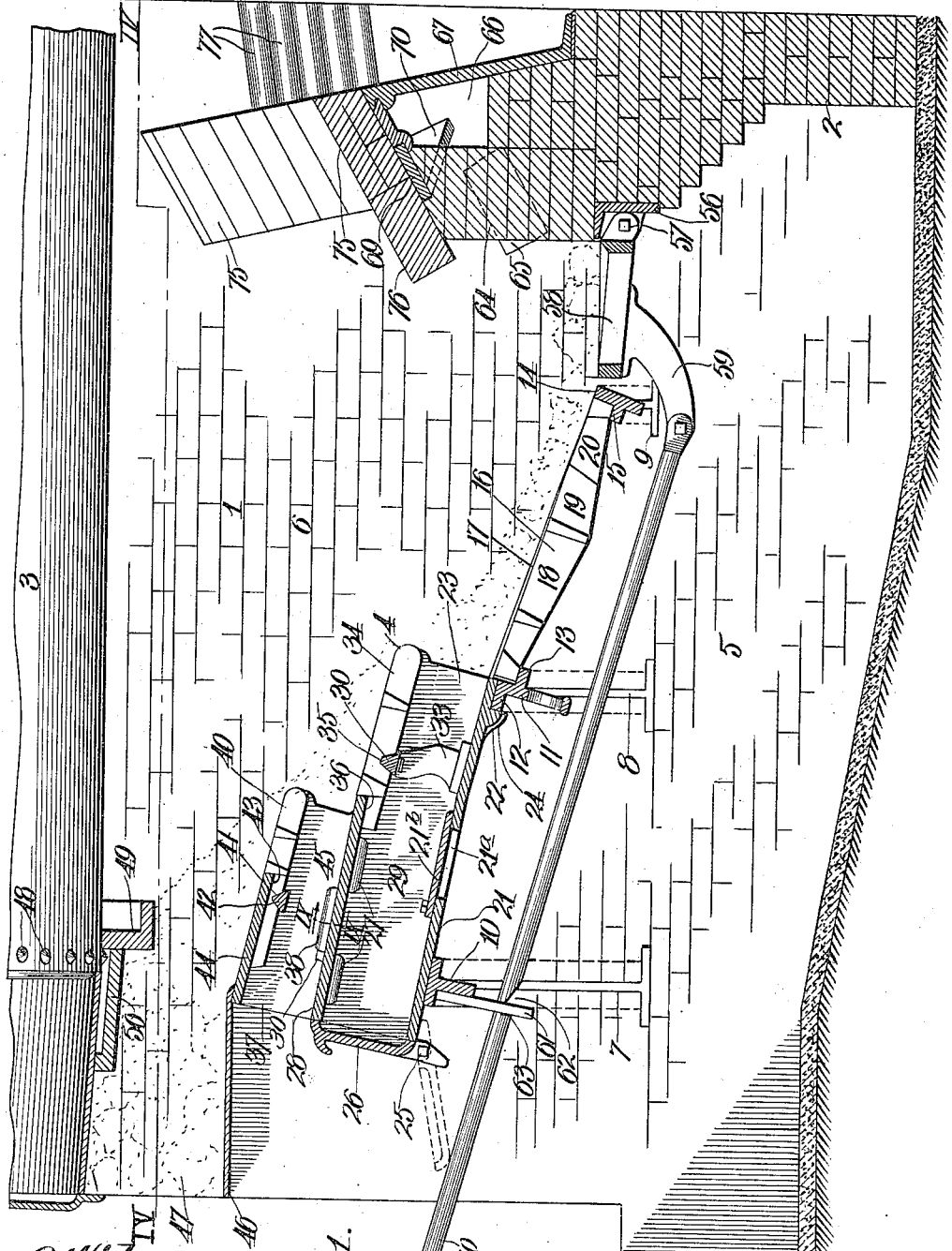

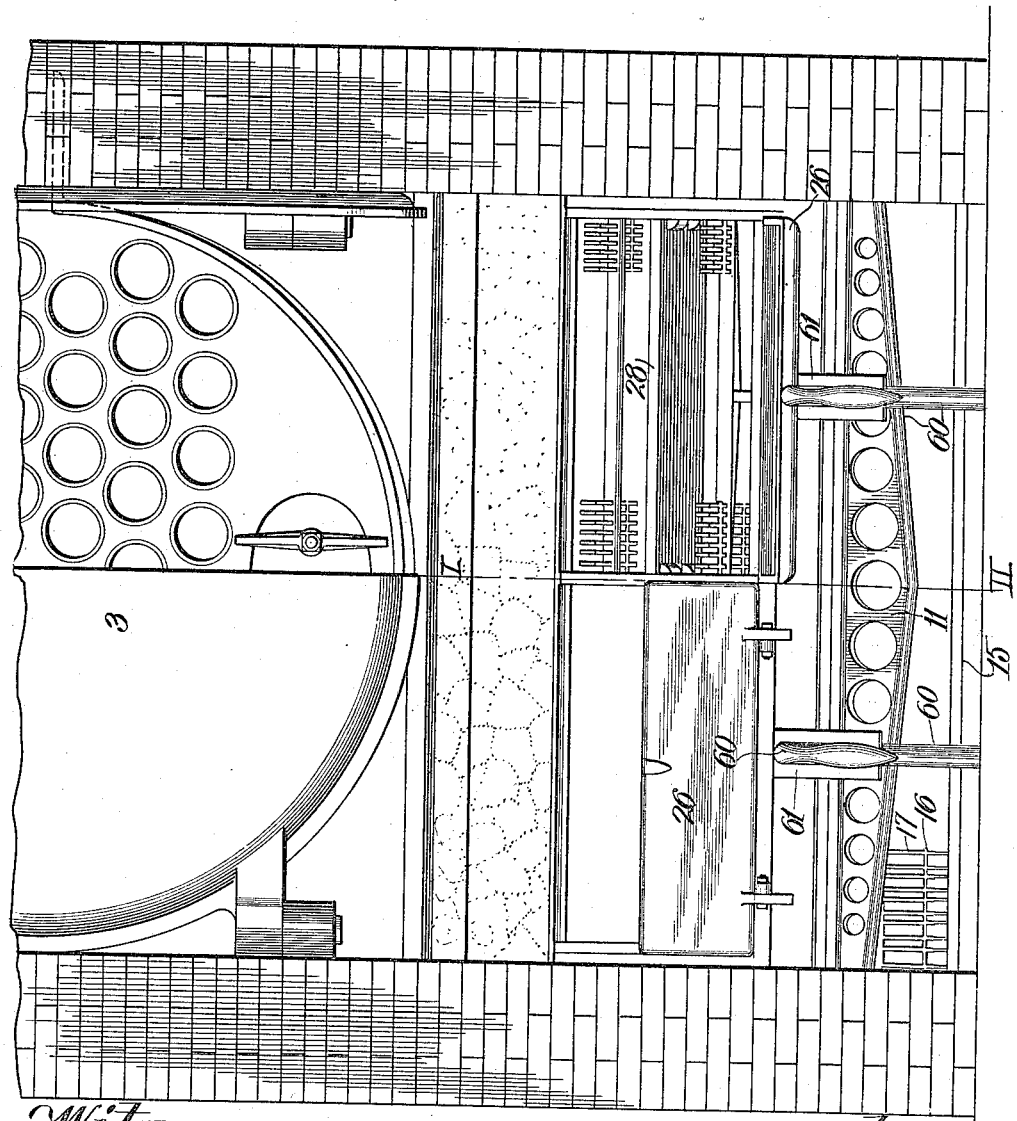

E. LANE.
SMOKE CONSUMING FURNACE.
APPLICATION FILED OCT. 4, 1909.
1,165,982.
Patented Dec. 28, 1915.
8 SHEETS—SHEET 4.
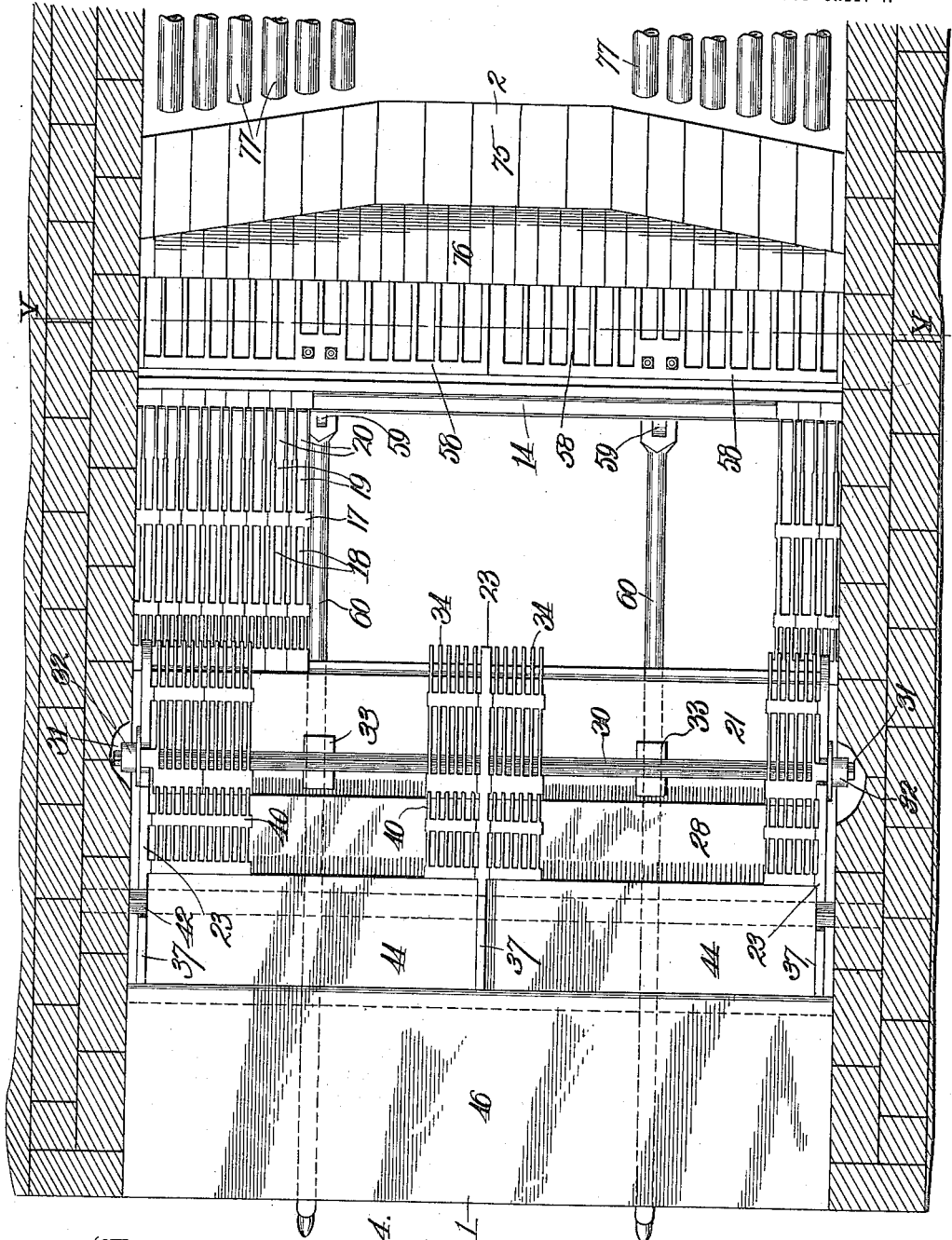

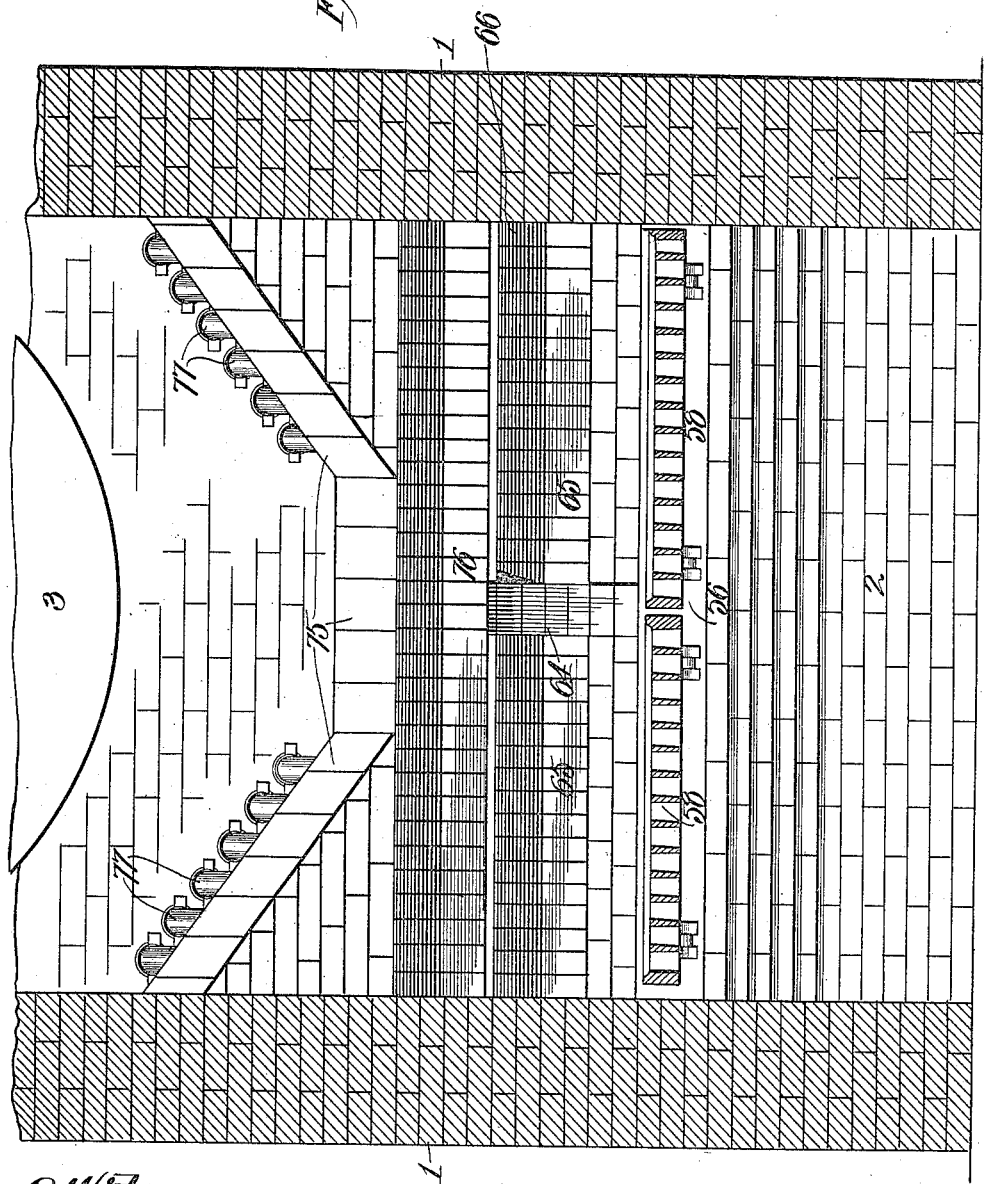

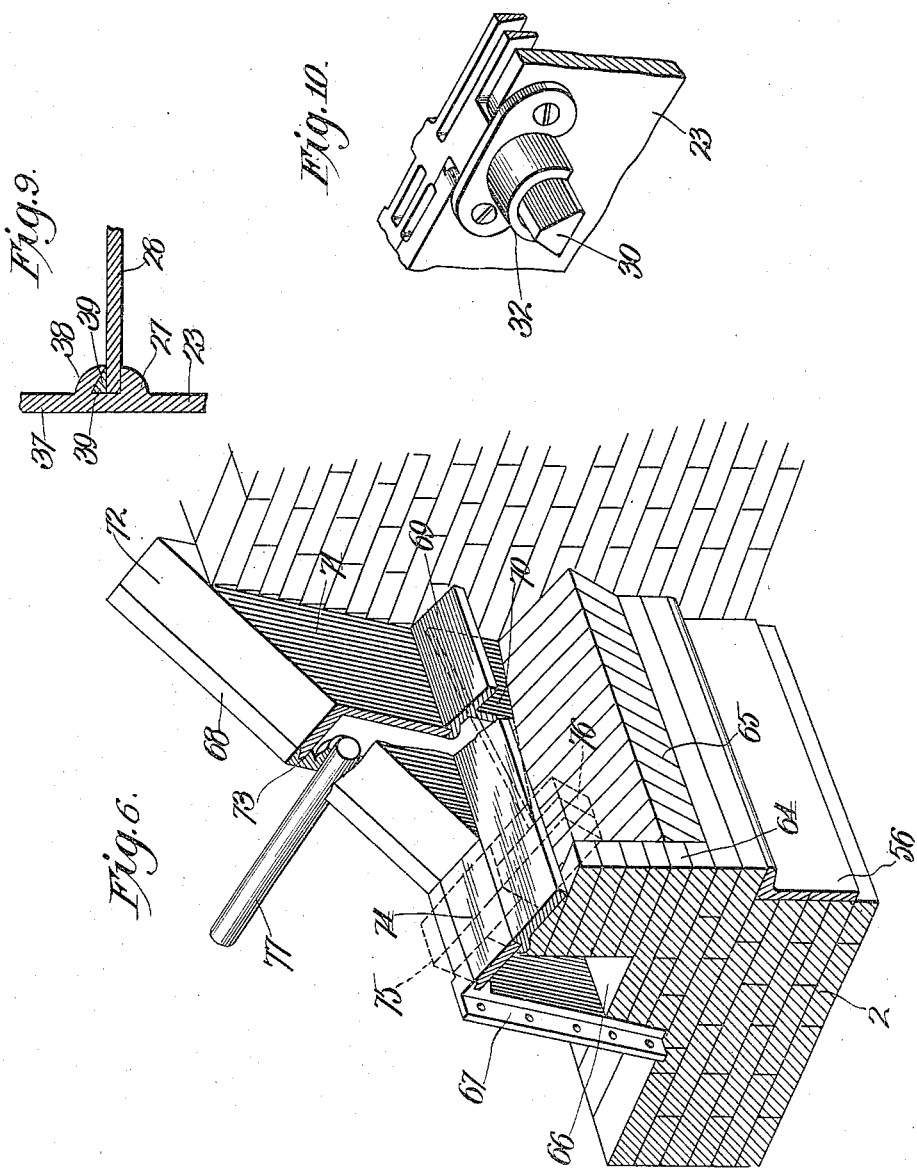

E. LANE.
SMOKE CONSUMING FURNACE.
APPLICATION FILED OCT. 4, 1909.
1,165,982.
Patented Dec. 28, 1915.
8 SHEETS—SHEET 7.
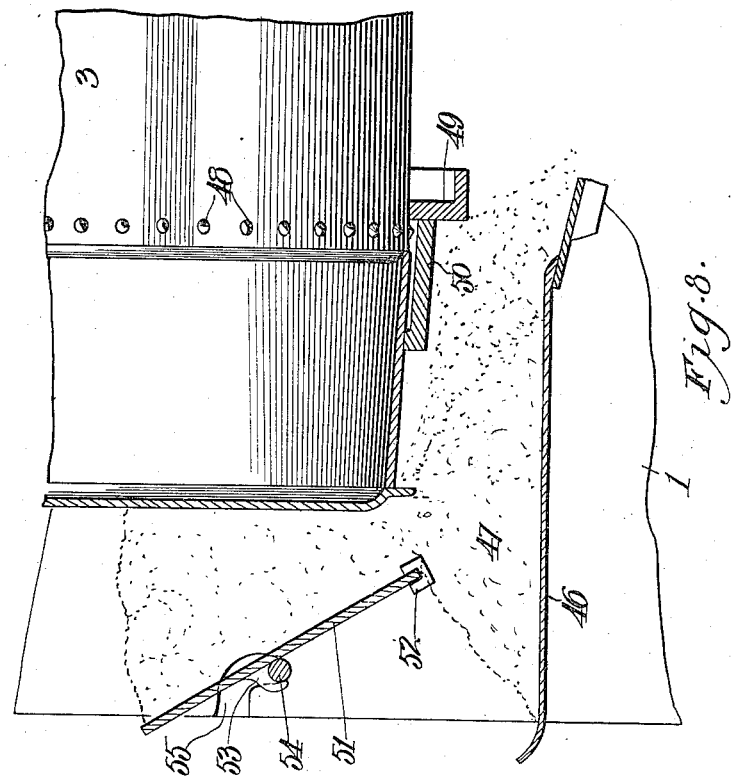
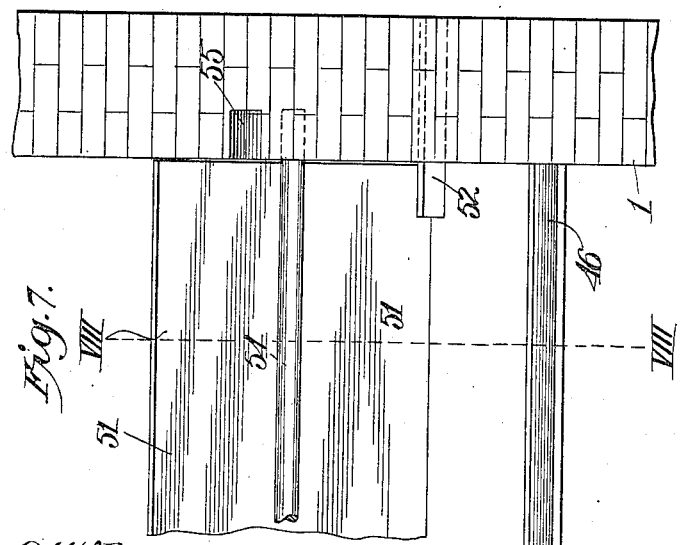
Witnesses
Frank R Glow
H C Rodgers
Inventor
Edward Lane.
By George Y Thorp Atty.

E. LANE.
SMOKE CONSUMING FURNACE.
APPLICATION FILED OCT. 4, 1909.
1,165,982.
Patented Dec. 28, 1915.
8 SHEETS—SHEET 8.
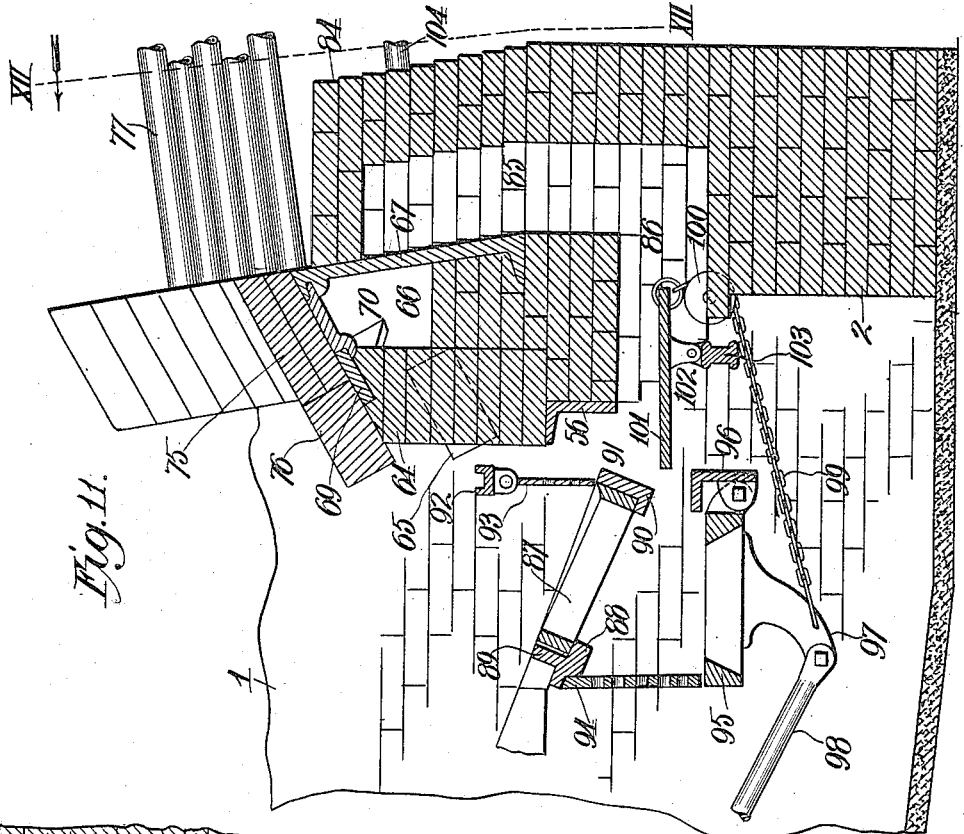
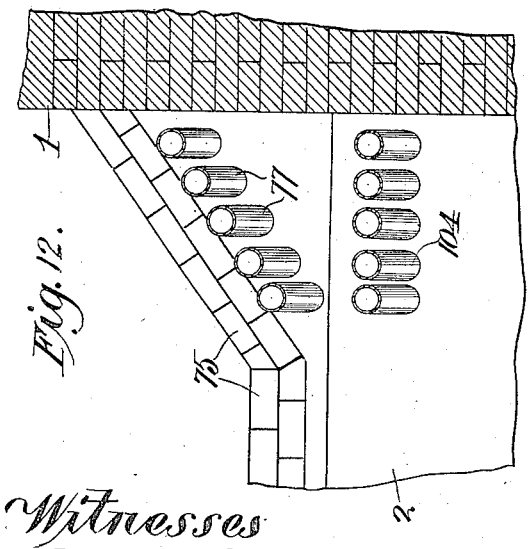
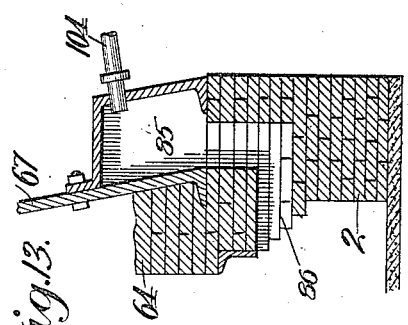
Witnesses
Frank R. Glore
H. C. Rodgers
Inventor
Edward Lane
By George F. Thorpe Atty.

UNITED STATES PATENT OFFICE.

EDWARD LANE, OF PITTSBURGH, PENNSYLVANIA.

SMOKE-CONSUMING FURNACE.

1,165,982.  Specification of Letters Patent.  Patented Dec. 28, 1915.

Application filed October 4, 1909. Serial No. 520,786.

*To all whom it may concern:*

Be it known that I, EDWARD LANE, a citizen of the United States, residing at Pittsburgh, in the county of Allegheny and State of Pennsylvania, have invented certain new and useful Improvements in Smoke-Consuming Furnaces, of which the following is a specification.

This in an improvement on the furnace construction shown in my prior application No. 394,566, filed September 24, 1907, in which I have claimed my invention broadly.

This invention relates to smoke consuming furnaces, and my object is to produce an efficient and reliable furnace of this character.

With this general object in view and others as hereinafter appear, the invention consists in certain novel and peculiar features of construction and organization as hereinafter described and claimed; and in order that it may be fully understood reference is to be had to the accompanying drawings, in which:

Figures 1 and 2 are vertical sections on the line I—II of Fig. 3, said Figs. 1 and 2 forming conjointly a complete vertical longitudinal section of the furnace. Fig. 3 is a front view partly broken away and with certain parts omitted. Fig. 4 is a horizontal section on the line IV—IV of Fig. 1. Fig. 5 is a vertical transverse section on the line V—V of Fig. 4. Fig. 6 is a sectional perspective view to disclose more clearly the bridge-wall construction. Fig. 7 is a front view of the fuel supply part of the furnace, said part being omitted from the other figures. Fig. 8 is a vertical section on the line VIII—VIII of Fig. 7. Fig. 9 is a section on the line IX—IX of Fig. 1. Fig. 10 is a sectional perspective view to disclose more clearly the protector for one of the ends of the grate bar. Fig. 11 is a central vertical section of a modified construction of a part of the furnace. Fig. 12 is a section on the line XII—XII of Fig. 11. Fig. 13 is a section on a reduced scale of a slightly modified form of the bridge wall and shows one of the pipes for supplying air thereto equipped with enlargements or collars to close the holes in the bridge wall through which said pipes extend when the latter are expanded by heat. Fig. 14 is an enlarged detail perspective view of one of the sleeves for receiving the rear end of one of a series of pipes forming part of the furnace. Fig. 15 is an enlarged view of a part of the rear end of the furnace to disclose the construction and arrangement of the rear end of one of the sleeves and the pipe therein. Fig. 16 is a section on the line XVI—XVI of Fig. 15 and includes a valve-controlled plug not shown in Fig. 15.

In the said drawings, 1 indicates a furnace having a bridge wall 2 below the boiler 3, and a system of grates 4 dividing such chamber into an ash pit 5 and a combustion chamber 6.

7, 8 and 9 are flanged standards of gradually diminishing length set in the side walls with their inner edges flush with the inner surfaces of said walls and with their lower ends or bases on the same course of bricks of said walls, the upper ends of standards 7 being connected by a horizontal cross bar 10 whose upper side is sloped slightly downward and rearward, and the rear ends of standards 8 are connected by a cross bar 11, having a forwardly projecting flange 12 and a rearwardly projecting flange 13, the latter lower than the former. Standards 9 are connected by a cross bar 14 having a forwardly projecting flange or rib 15 and fitting snugly between cross bars 11 and 14 and resting on the flanges 13 and 15 respectively of said cross bars, is a main grate 16, consisting of a plurality of similar bars 17 arranged side by side so as to be capable of being readily placed in or removed from position, each of said bars being formed with longitudinally alined openings or interstices 18, 19, and 20, of gradually increasing width, it being noticed also by reference to Fig. 4, that the adjacent sides and middles are spaced apart, the spaces between adjacent bars alternating with the slots or interstices in the bars.

21 are inclined plates arranged side by side and resting upon flange 12 of bar 11, and upon cross bar 10, and provided with depending stop ribs 22 engaging the front edge of flange 12 to prevent the said plates from slipping or creeping rearwardly as they have a tendency to do because they are inclined to correspond approximately with the inclined plane of the top of bars 10 and 11.

In the drawings two plates 21 are shown, but it is to be understood that the width of the furnace will preferably determine the number of said plates, and each of said plates 21 is provided with one or more openings 21ª normally closed by a pivoted valve 21ᵇ.

23 indicates a pair of side plates and a central plate arranged vertically on bars 10 and 11 and provided with depending lugs 24 to bear against the front edge of flange 12 to prevent them moving rearwardly, the side plates 23 being arranged against the outer edges of plates 21 and the intermediate plates 23 between the adjacent edges of said plates 21, and hinged to the front edges of the last-named plates at 25 are doors 26 for a purpose which hereinafter appears. The plates 23 are provided near their upper edges with lugs 27 as a support for plates 28, said plates terminating at their rear edges, by preference, a considerable distance short of the rear edges of plates 21, and forming in conjunction with the latter and plates 23 a pair of longitudinal air passages 29 adapted to be closed by doors 26 when the latter occupy the position shown in full lines Fig. 1, which position they maintain by gravity.

Rearward of and slightly below the plane of plate 28 is a cross bar 30, which extends through plates 23 and into openings 31 in the walls of the furnace, and to guard against injury to said walls through the expansion of said bar, the side plates 23 are provided at their outer sides with inverted U shaped guards 32 which also project into said openings and overlie and are slightly spaced from the cross bar to provide for a circulation of air around the same and incidentally prevent coal or ashes from filling the opening around the cross bars, and thus interfere with the expansion of the latter. The cross bar 30 is supported by a series of integrally-cast feet 33 secured to plate 21 in any suitable manner, these feet being bowed rearwardly or toward the part of the combustion chamber where the heat is most intense for the purpose of successfully resisting the tendency of the bar 30 to bow toward the rear part of the combustion chamber, it having been found in practice that some method of bracing the cross bar when exposed to such a high temperature was necessary.

Mounted upon cross bar 30 and upon plates 23 rearward of plate 28, is a grate 34, consisting by preference of two sections arranged respectively between the plates 23 and as said grate sections like plate 28 have a tendency to slide downward and rearward because approximately parallel with plates 21, they are provided with notches 35 in their lower edges receiving cross bar 30, the front ends of the grates being notched at 36 to receive the rear edges of plates 28 so that the upper surface of said plates and grate 34 lie flush.

Plates 23 forward of grate 34 and at opposite sides of plates 28 are provided with upward extensions 37 and with lugs 38 overlying plates 28 and bearing an angular relation thereto, wedges 39 being dove-tailed between said lugs and plate 28, to clamp the latter reliably in position. Above the rear half of plates 28 is a grate 40, consisting by preference of two members arranged between the extensions 37 of plates 23 and substantially parallel with plates 28, and said grate is provided with notches 41 to receive the transverse cross bar 42, corresponding in all essential particulars to cross bar 30 and extending through the extensions 37, it being also understood that said cross bar 42 is adapted to project into recesses, not shown, in the side walls of the furnace and be protected as explained, by guards corresponding to guards 32 of cross bar 30. The grate 40 is also provided with notches 43 to receive plates 44 disposed at the same angle as said grate and supported by the latter in the plane of the upper edges of the extensions 37 of plates 23, said plates 44 in connection with the extensions of plates 23 and plates 28 forming air pasages 45, which may if desired, be closed at their front ends by doors, not shown, corresponding to doors 26.

From the foregoing it will be seen that the various parts of the grate structure are secured reliably in position without the use of bolts or other devices, the gravitative tendency of the parts of the grate holding them reliably in place. It will be understood in this connection that the interstices or spaces between the bars of the uppermost grate 40 and the intermediate grate 34 like the main grate may and preferably will increase slightly in width toward the rear of the furnace, the topmost grate having the smallest interstices by preference for the purpose of preventing the fine raw fuel from dropping therethrough and compelling it to coke or lump and in such condition pass onto the next below and thence to the main grate and finally to the dump grate hereinafter referred to. By this arrangement the fuel is not only retained upon the grate bars and thus conserved, but the interstices of the latter are kept more unobstructed to admit a maximum volume of air in order to obtain substantially the same result from slack coal that could be derived from the use of lump coal.

46 is a preferably horizontal plate extending from side wall to side wall and extending forwardly from the upper edge of plates 44 and spaced a suitable distance below the boiler, said plate forming in conjunction with the side walls and the boiler, a fuel magazine 47, and to aid in supporting the front end of the boiler and incidentally protect the front rivets 48 thereof, an angle bar 49 underlies the boiler just rearward of such rivets and forward of the vertical plane of grate 40, so as to be interposed between what burning fuel may lie upon said grate and the rivets, the rivets being further protected by the cross bar 50 forward of cross bar 49.

In view of the necessity of illustrating the furnace on as large a scale as possible in order to properly show the invention, Figs. 7 and 8 are provided to show the major portion of the fuel magazine, it being noticed by reference to Fig. 8, that the plate 46 projects some distance forward of the boiler and that forward of the latter and above said plate is a downwardly and rearwardly sloping plate 51, which in conjunction with the side walls of the furnace and the boiler constitute a hopper to feed fuel down to the plate 46. Plate 51 preferably rests at its lower edges in channel bars 52 set in the walls of the furnace and is also provided in its front side with a downwardly-disposed hook 53 engaging a cross bar 54 fitting in recesses in said wall, this arrangement permitting said plate to be readily placed in or removed from position.

When the hopper and fuel magazine are charged with the slack, customarily employed as fuel for steam boiler furnaces, it will be apparent that such fuel will prevent the entrance of air into the furnace above the topmost grate and that the fuel resting upon plate 46 as it cokes, can be readily and easily pushed farther into the furnace by means of a prod or poker, not shown, inserted into the magazine below the hopper thereof, and that this feeding of the furnace can be accomplished without necessarily admitting air thereto above the topmost grate.

The bridge wall 2 is formed to overhang the rear part of the ash pit, and forming a support for the front and upper portion of the bridge wall is an angle bar 56, and pivoted to said angle bar at 57 is a dump grate 58 consisting of two sections arranged substantially horizontal and bridging the spaces between the bridge wall and cross bar 14 at the rear end of the main grate. Each section of the dump-grate is provided with a depending arm 59 pivotally connected to the rear end of a dump-grate-operating rod 60, said rods near their front ends extending through slotted hangers 61 and notched in their under sides at 62 to provide rearwardly-disposed shoulders 63, to bear against said hangers 61 at the lower ends of the slots of the same, and thus support the dump-grate sections in their operative positions.

To effect a discharge by means of the dump-grate sections from the combustion chamber to the ash pit below, the rods 60 are grasped and raised until shoulders 63 clear the lower ends of said slots. The rods may then be pushed rearwardly and thus cause the grate sections to swing downward and discharge clinkers and ashes into the pit below, it being noticed in this connection that the spaces or interstices between the bars of the dump-grate sections are by preference wider than the widest spaces or interstices of the main grate as the fuel is always massed in large lumps by the time it attains a position thereon. The wide interstices permit air from below to readily pass up into the combustion chamber through such fuel and also permit ashes and small clinkers to drop into the ash pit.

The bridge wall is formed with a vertical column of bricks 64 and at opposite sides of said column with inclined bricks 65 sloping downward and forward and forming the lower part of the mouth of the transverse hot-air chamber 66, the rear wall of which is shown as formed by a casting 67, extending from side wall to side wall, said casting 67 having enlarged tri-angular upwardly-projecting extensions 68 (see Fig. 6) embedded at their side edges in the side walls of the furnace. The top of the mouth of chamber 66 is preferably in the form of a cross bar 69 and parallels the bottom 65 and said cross bar 69 is provided with depending ribs 70, which taper from their lower outer corners which rest upon the outermost of the bricks 65 forming the bottom of the mouth of chamber 66, to the column 64, at which point they merge into the bottom of bar 69. By this arrangement it will be seen that what may be termed the throat of the mouth grows narrower from column 64 to the side walls of the furnace and thus tends to discharge the greater volume of hot air from chamber 66 into the middle portion of the furnace.

71 indicates triangular plates secured at their outer edges in the side walls and stepped at their lower edges upon the rear edge of the bar 69 forming the top of the mouth of the chamber 66, said triangular plates 71 paralleling the tri-angular extensions 68 of casting 67 and being spaced forward thereof, and projecting rearwardly from the upper or hypotenuse edges of plates 71, are flanges 72 which fit at their rear edges in grooves 73 in said extensions 68 and thus form the top of the enlarged ends of chamber 66. A plate 74 bridges the space between the lower ends of flanges 72 and the upper edges of the central portions of plates 68 and casting 67 to form the top of the central or smaller portion of said chamber 66, it being noticed in Fig. 6, that the casting 67 is preferably in two sections, one only being shown, adapted to be step-jointed and bolted together and that said castings are supported upon the rear portion of the bridge wall, it being also understood in this connection that by reason of the fact that the chamber 66 is larger at its ends than at its middle as hereinbefore suggested, but that as its throat near the middle is of greater area than at its ends, the tendency of the hot air in the ends of said chamber is to be forced toward its center and pass under pressure through the throat and mouth into the central portion of the furnace and thus tend to act as a blast, on the fuel on the main and dump grates and effect a combustion sufficiently fierce to consume the smoke, and combustible gases or products of combustion which arise from the coking fuel on the front or supplemental grates 34 and 40.

To protect the preferably metal portions of the bridge-wall from the intense heat of the furnace, bricks 75 are superposed upon plate 74 and flanges 72 of plates 71, and bricks 76 paralleling bricks 65 are secured upon and project forward from bar 69 to increase the length of the upper part of the mouth of the chamber 66, as shown in full lines Fig. 1 and dotted lines Fig. 6.

To supply hot-air to the chamber 66 where its temperature will be raised preliminary to its forcible ejection onto the fuel as hereinbefore explained, I provide the inclined series of air pipes 77. Each series of said pipes collectively slope downward and inward and individually slope downward and forward and communicate at their front ends with the enlargements of chamber 66 and at their rear ends extend through sleeves 78 in the rear wall of the furnace, the pipes being supported at their intermediate points by brick or equivalent piers 77$^a$. The sleeves 78 are slit at their ends at 79 to produce lips 80 which are bent outwardly and bear against the outer and inner faces of said rear wall. The rear ends of pipes 77 project slightly beyond the rear ends of the sleeves and are slit to produce lips 81 bent outwardly against the rear ends of the sleeves to guard against any possibility of the pipes sliding forward. After the parts are thus arranged the rear end of the spaces between the pipes and sleeves are plugged with clay 82 or its equivalent to prevent air passing into the furnace through the rear wall except through pipes 77, which clay can be readily dislodged should it be found necessary to withdraw one of the pipes 77 from position and replace it by another. Fitting in the rear end of each pipe 77 is a tubular plug 83 provided with a pivoted valve or closure plate 84 so that the pipes may be separately wholly or partially closed.

Referring now to Figs. 11 and 12 in the former of which is shown a supplemental combustion chamber, it will be seen that the rear portion of the bridge wall is extended upward and then forward to the back of casting 67 as shown at 84 so as to provide a hot-air chamber 85, and said chamber is provided at its lower end with a mouth 86 through which hot-air may pass forwardly into the furnace below the main grate extension 87 which is located, in the construction shown in Fig. 11, at substantially the same point as the dump-grate 58, in Fig. 1, it being noticed by reference to Fig. 11 that extension 87 rests on a flange 88 of cross bar 89 corresponding in function to cross bar 15 hereinbefore described, and on an L-shaped cross bar 90 and that it is spaced forward of cross bar 56 to provide a passage 91.

92 is a cross bar vertically above the rear end of grate 87 and pivotally depending from said cross bar is a perforated door plate 93, the same being sufficiently heavy to resist swinging back under the pressure of any ordinary piece of fuel which may roll or fall against it, being susceptible of yielding to the pressure of fuel when the latter is being poked or prodded to feed it rearward on the main grate.

94 is a perforated plate depending rigidly from bar 88 and underlying said plate and the grate extension 87 is a dump-grate 95 pivoted to a cross bar 96 and provided with an arm 97 connected to the rear end of the dump-grate-operating bar 98, and connected to said arm 97 is a chain 99 extending around a guide sheave 100 to the rear end of dump-grate 101 pivoted at 102 to a cross bar 103. When grate 95 is in operative position as shown in Fig. 11, it holds dump-plate 101 horizontal and forming a bottom for the passage 91. To supply air to chamber 85 for the purpose of keeping alive combustion of fuel, such as clinkers, which may pile up against plate 93, a series of pipes 104 communicate at their front ends with chamber 85, the rear ends of said pipes being adapted to be secured in the rear wall of the furnace in any suitable manner but preferably as explained in connection with the rear ends of pipes 77, though the replacement of pipes 104 will not be necessary as frequently as the replacement of pipes 77 because the latter are in the more direct path of the flames which pass up over the bridge-wall and under the boiler to the rear end of the same.

Assuming that there is burning fuel upon the grates and that the fuel magazine is fully-charged, it will be apparent that air can enter the furnace from its front end by way of the ash pit and up through grates 16 and 58, the perforated bar 11 permitting air to pass up through grate 16 at its extreme end. Air can also enter the furnace from its front through passages 29 or the passages between plates 28 and 44, it being noticed that the air entering the furnace above plates 21 and 28 may enter the combustion chamber by passing directly through the body of the fuel in front of it and by passing upward through the overlying grates 34 and 40 and the fuel thereon.

After satisfactory combustion is attained, the doors 26 are preferably closed to cut off a large percentage of the volume of air supplied to the furnace through passages 29 and if desired the valves 21ᵇ may be closed to permit a reduced volume of air to pass upwardly into such passages through openings 21ᵃ and thence rearwardly into the furnace. It will thus be seen that by the opening or closing of the doors and the described manipulation of the valves, the volume of air supplied to the furnace through passages 29 may be regulated.

In the operation of the furnace the fuel is coked upon plate 44 and grate 40 and the smoke arising therefrom is burned before it can pass over the bridge wall, it being understood that all of the fuel that is permitted to gravitate or that is pushed downward upon grate 34 and then successively onto grates 16 and 58 is in an incandescent state and therefore emits no smoke, and to intensify the combustion in the combustion chamber a blast of hot air, which enters from the rear end is heated by pipes 77, is discharged over the dump-grate and grate 16 through the downwardly and forwardly inclined mouth of chamber 66 and in this connection it should be stated that the mouth of said passage is above the plane of any fuel that may accumulate upon the dump-grate and therefore cannot be clogged or closed by such fuel, the forward inclination of the mouth guarding against any possibility of fuel remaining in it might possibly be projected therein by a sufficiently powerful thrust of the poker or other device against the fuel.

It is undesirable that air shall enter the furnace through the raw fuel and the capacity of plate 46 will therefore be sufficient to insure that the fuel shall close around or behind the poker or prod which may be introduced at intervals for the purpose of pushing some of the coked fuel from grate 40 down onto grate 34, in fact the mass of the fuel in the magazine will be such that it will seldom be necessary to force the poker or prod completely through the same as in the manipulation of such poker or prod the fuel at the rear or lower end of grate 40, which fuel is incandescent, will be forced onto grate 34 by the raw and coking fuel in front of it.

It will be seen that to this furnace a maximum volume of air will be supplied, as by reason of the fact of the fuel massing into large lumps as it progresses toward the rear, it cannot close the interstices or openings of the grates, it will be seen that slack coal can be burned and the same result obtained from it as from lump coal.

It will be apparent that the supply of air to support combustion can be regulated while the furnace is in operation as the valves 21ᵇ can be opened or closed by means of a poker. It will also be apparent that a fierce combustion can be maintained in the extreme rear of the furnace because of the fact that the hot air of chamber 66 is discharged down upon the dump-grate. When ashes have accumulated or a clinker is to be dislodged which has formed upon said dump grate the rod or rods 60 are manipulated to swing the dump grate downward and discharge such ashes or clinkers into the ash pit below.

It will also be observed by reference particularly to Figs. 2 and 5 that the construction and arrangement of the upper part of the bridge wall and of the series of air supply pipes 77 is such as to provide a passage which tapers substantially uniformly from the bridge wall to the rear end of the boiler, such passages being of substantially inverted-arc shaped so as to correspond approximately to the curvature of the lower side of the boiler in order that the lower part of the boiler shall be as effectively subjected to hot air as the side portions of the boiler at opposite sides of the longitudinal center of its lower portion. The arrangement of the pipes 77 is such that any one of them may be quickly and easily removed at any time without the removal or disturbance of a brick, as the sleeves 78 are of sufficient length to permit said pipes to be readily centered with respect to the holes provided for their reception in the rear part of the bridge wall.

In the modified construction shown in Figs. 11 to 13 inclusive, air heated in pipes 104 and additionally heated in chamber 85 is discharged forwardly into the lower end of passage 91, and over dump-grate 95 below grate 87, part of such air passing upwardly through and forwardly over the last-named grate by way of door 93 and coöperating with the blast of air from the mouth of chamber 66 to effect complete consumption of the fuel upon said grate 87. In this furnace slow-burning clinkers which accumulate upon the rear portion of grate 87 can be prodded rearwardly off said grate into passage 91, the perforated door 93 yielding rearwardly under such pressure or prodding and then returning to substantially its original position, the dump plate 101 serving to catch and retain such dislodged clinkers and ashes temporarily. The dump-grate 95 catches the finer particles of fuel dropping through grate 87 and retains the same until substantially all of the heat units are extracted, the combustion upon grate 95 being supported by the air which passes up through said grate, rearwardly through the perforated plate 94 and forwardly over said grate from passage 85, the air last referred to passing forwardly under dump-plate 101, it being also understood that the clinkers caught and retained by plate 101 are kept alive for a time by the air which passes forwardly from chamber 85 over the dump-plate to effect the extraction of all of the heat units and thus tend to the economical operation of the furnace as a whole.

When practically all of the heat units have been extracted from the fuel on the dump-grate 95, rod 98 is manipulated to impart movement to said grate, dump-plate 101 dumping the clinkers and ashes which may be lodged upon it, at the same time, the return of the dump-grate to position by a forward pull on rod 98 is attended by the return of the dump-plate to its original operative position because of the guided chain connecting them.

From the above description it will be apparent that I have produced a smoke consuming boiler furnace embodying the features of advantage enumerated as desirable and I wish it to be understood that I do not desire to be restricted to the exact details of construction shown and described as obvious modifications will suggest themselves to one skilled in the art.

The claims for the bridge wall construction *per se*, and for the construction and arrangement of the tubes for feeding the air to the chambers in the bridge wall are in my divisional application No. 535,953, filed January 3, 1910. In the following claims, therefore, I have claimed the construction of the grate *per se*, and also the dumping apparatus of said grate in combination with the bridge wall and hot air tubes.

Having thus described the invention what I claim as new and desire to secure by Letters Patent, is:—

1. In a furnace, a bridge wall, a boiler above the same, a pair of standards set in the side walls near the bridge wall, a cross bar connecting said standards, a second pair of standards set in the side walls forward of the first pair of standards with their lower ends in the same horizontal plane as said first pair of standards, a cross bar connecting the said second pair of standards, a third pair of standards of greater length than the second pair of standards and arranged forward thereof and set in the side walls of the furnace and arranged with their base ends in the horizontal plane of the base ends of the first-named standards, a cross bar connecting the upper ends of the third pair of standards, a main grate bridging the space between the side walls and supported by the cross bars connecting the first and second pairs of standards, a pair of vertical side plates mounted upon the cross bars of the second and third pairs of standards, means to prevent rearward movement or creepage of said side plates, a plate mounted upon the cross bars of the second and third pairs of standards between said side bars, means to prevent rearward movement or creepage of said plate, a second plate above and substantially parallel with the first-named plate and supported by said side bars, a supplemental grate suitably supported between said side bars in the plane and at the rear edge of said second plate and preventing rearward movement or creepage of the latter, a door at the front end of the passage formed by and between said side plates and the plates between the same, a third plate substantially parallel with and above the front portion of the second plate and between the side plates, a second supplemental grate in the plane and rearward of the said third plate and supporting and preventing rearward movement of the same, and a fuel-supporting plate under the front end of the boiler and extending from side wall to side wall and forwardly from the front end of the said third plate, and means whereby clinkers and dead fuel may be discharged into the ash-pit at a point rearward of said main grate.

2. In a furnace, a bridge wall, a boiler above the same, a pair of standards set in the side walls near the bridge wall, a cross bar connecting said standards, a second pair of standards set in the side walls forward of the first pair of standards with their lower ends in the same horizontal plane as said first pair of standards, a cross bar connecting the said second pair of standards, a third pair of standards of greater length than the second pair of standards and arranged forward thereof and set in the side walls of the furnace and arranged with their base ends in the horizontal plane of the base ends of the first-named standards, a cross bar connecting the upper ends of the third pair of standards, a main grate bridging the space between the side walls and supported by the cross bars connecting the first and second pairs of standards, a pair of vertical side plates mounted upon the cross bars of the second and third pairs of standards, and provided with lugs engaging one of the cross bars to prevent rearward movement or creepage thereof, a plate mounted upon the cross bars of the second and third pairs of standards between said side bars, provided with lugs engaging one of the cross bars to prevent rearward movement or creepage of said plate, a second plate above and substantially parallel with the first-named plate and supported by said side bars, a supplemental grate suitably supported between said side bars in the plane and at the rear edge of said second plate and preventing rearward movement or creepage of the latter, a door at the front end of the passage formed by and between said side plates and the plates between the same, a third plate substantially parallel with and above the front portion of the second plate and between the side plates, a second supplemental grate in the plane and rearward of the said third plate and supporting and preventing rearward movement of the same, a fuel-supporting plate under the front end of the boiler and extending from side wall to side wall and forwardly from the front end of the said third plate, and means whereby clinkers and dead fuel may be discharged into the ash-pit at a point rearward of said main grate.

3. In a furnace, a bridge wall, a boiler above the same, a grate, a plate suitably supported at the front end of the said grate, vertical side plates, a plate carried thereby and arranged substantially parallel with the first-named plate and terminating short of the rear end of the latter, a supplemental grate arranged in substantially the plane of the second plate and rearward thereof and adapted to discharge on the first-named grate, a cross bar supported from the first-named plate and extending through said side plates into the side walls of the furnace and supporting and holding the said supplemental grate against rearward movement, a third plate above the second and supported by said side plates and terminating short of the rear end of said second plate and arranged substantially parallel therewith, a second supplemental grate occupying the plane of said third plate and arranged rearward thereof to discharge onto said first-named supplemental grate, a cross bar extending through said side plates and into the side walls of the furnace and supporting said second supplemental grate and preventing rearward movement thereof, inverted-U shaped guards secured to the side plates and projecting into the side walls around the ends of the said cross bars projecting therein, a plate extending from side wall to side wall and forwardly from the front edge of the said third plate and underlying the boiler and forming a support for the fuel destined for said grates, and means whereby clinkers and dead fuel may be discharged into the ash-pit at a point rearward of the said main grate.

4. In a furnace, a grate, a bridge wall arranged rearward of and spaced from the grate and provided with two hot-air chambers having mouths to discharge air respectively above and below the grate, a dump-plate in the lower mouth to catch and retain clinkers discharged from the grate and direct air from said mouth under and above said grate and upon said clinkers, and a door overhanging the rear end of the grate and adapted to yield to permit clinkers and ashes to be pushed off the rear end of said grate and down on the said dump-plate.

5. In a furnace, a grate, a bridge wall arranged rearward of and spaced from the grate and provided with two hot air chambers having mouths to discharge air respectively above and below the grate, a dump-plate in the lower mouth to catch and retain clinkers discharged from the grate and direct air from said mouth under and above said grate and upon said clinkers, a door overhanging the rear end of the grate and adapted to yield to permit clinkers and ashes to be pushed off the rear end of said grate and down on the said dump-plate, and a dump grate below the rear end of the said grate and below the plane of the said dump-plate, and means for controlling the dumping actions of said dump grate and dump plate.

6. In a furnace, a grate, a bridge wall arranged rearward of and spaced from the grate and provided with two hot air chambers having mouths to discharge air respectively above and below the grate, a dump-plate in the lower mouth to catch and retain clinkers discharged from the grate and direct air from said mouth under and above said grate and upon said clinkers, a door overhanging the rear end of the grate and adapted to yield to permit clinkers and ashes to be pushed off the rear end of said grate and down off the said dump-plate, a dump-grate below the rear end of the said grate and below the plane of the said dump-plate, means for controlling the dumping actions of said dump-grate and dump-plate, and a perforated plate between the front end of the dump-grate and the first-named grate.

7. In a furnace, a grate, a bridge wall arranged rearward of and spaced from the grate and provided with two hot-air chambers having mouths to discharge air respectively above and below the grate, a dump-plate in the lower mouth to catch and retain clinkers discharged from the grate and direct air from said mouth under and above said grate and upon said clinkers, a door overhanging the rear end of the grate and adapted to yield to permit the clinkers and ashes to be pushed off the rear end of said grate and down on the said dump-plate, inclined pipes communicating with the atmosphere at their higher ends and communicating with the upper chamber of the bridge wall at their opposite ends, and inclined pipes communicating at their higher ends with the atmosphere and at their front ends with the other chamber of the bridge wall.

8. In a furnace, a grate, a bridge wall arranged rearward of and spaced from the grate and provided with two hot air chambers having mouths to discharge air respectively above and below the grate, a dump-plate in the lower mouth to catch and retain clinkers discharged from the grate and direct air from said mouth under and above said grate and upon said clinkers, a door overhanging the rear end of the grate and adapted to yield to permit clinkers and ashes to be pushed off the rear end of said grate and down on the said dump-plate, a dump-grate below the rear end of the said grate and below the plane of the said dump-plate, means for controlling the dumping actions of said dump-grate and dump-plate, a perforated plate between the front end of the dump-grate and the first-named grate, inclined pipes communicating with the atmosphere at their higher ends and communicating with the upper chamber of the bridge wall at their opposite ends, and inclined pipes communicating at their higher ends with the atmosphere and at their other ends with the other chamber of the bridge wall.

In testimony whereof I affix my signature, in the presence of two witnesses.

EDWARD LANE.

Witnesses:
HELEN C. RODGERS,
G. Y. THORPE.

Copies of this patent may be obtained for five cents each, by addressing the "Commissioner of Patents, Washington, D. C."